United States Patent
Hori et al.

(10) Patent No.: US 11,621,428 B2
(45) Date of Patent: Apr. 4, 2023

(54) ANODE CATALYST LAYER FOR FUEL CELL AND FUEL CELL USING SAME

(71) Applicant: CATALER CORPORATION, Kakegawa (JP)

(72) Inventors: Akihiro Hori, Kakegawa (JP); Yosuke Horiuchi, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 60 days.

(21) Appl. No.: 17/270,491

(22) PCT Filed: Sep. 4, 2019

(86) PCT No.: PCT/JP2019/034858
§ 371 (c)(1),
(2) Date: Feb. 23, 2021

(87) PCT Pub. No.: WO2020/059503
PCT Pub. Date: Mar. 26, 2020

(65) Prior Publication Data
US 2021/0351419 A1    Nov. 11, 2021

(30) Foreign Application Priority Data
Sep. 18, 2018   (JP) .............................. JP2018-174019

(51) Int. Cl.
*H01M 4/90* (2006.01)
*H01M 4/88* (2006.01)
(Continued)

(52) U.S. Cl.
CPC ....... *H01M 4/9083* (2013.01); *H01M 4/8652* (2013.01); *H01M 4/8673* (2013.01);
(Continued)

(58) Field of Classification Search
None
See application file for complete search history.

(56) References Cited

U.S. PATENT DOCUMENTS

2008/0032181 A1* 2/2008 Yamamoto .......... H01M 4/9083
429/480
2009/0162725 A1   6/2009 Terazono et al.
(Continued)

FOREIGN PATENT DOCUMENTS

CA    3035582 A1    4/2018
JP    200841411 A    2/2008
(Continued)

OTHER PUBLICATIONS

Nov. 5, 2019 International Search Report issued in International Patent Application No. PCT/JP2019/034858.
(Continued)

*Primary Examiner* — Jonathan Crepeau
(74) *Attorney, Agent, or Firm* — Oliff PLC

(57) ABSTRACT

An anode catalyst layer for a fuel cell includes: electrode catalyst particles; a carbon carrier carrying the electrode catalyst particles; water electrolysis catalyst particles; a proton-conductive binder; and a graphitized carbon, wherein the content of the graphitized carbon in the anode catalyst layer for a fuel cell is 3-70 mass % with respect to the total mass of the electrode catalyst particles, the carbon carrier, and the graphitized carbon.

10 Claims, 2 Drawing Sheets

(a)

(b)

(c)

(51) Int. Cl.
*H01M 8/1004* (2016.01)
*H01M 4/86* (2006.01)
*H01M 4/92* (2006.01)
*H01M 8/10* (2016.01)

(52) U.S. Cl.
CPC ......... *H01M 4/8825* (2013.01); *H01M 4/926* (2013.01); *H01M 8/1004* (2013.01); *H01M 4/9016* (2013.01); *H01M 2004/8684* (2013.01); *H01M 2008/1095* (2013.01)

(56) References Cited

U.S. PATENT DOCUMENTS

| | | |
|---|---|---|
| 2012/0064435 A1 | 3/2012 | Maruyama et al. |
| 2017/0062851 A1* | 3/2017 | Mathias .................. B60L 58/30 |
| 2020/0036012 A1* | 1/2020 | Ye ...................... H01M 4/8657 |

FOREIGN PATENT DOCUMENTS

| | | |
|---|---|---|
| JP | 2009-152143 A | 7/2009 |
| JP | 2010-277995 A | 12/2010 |

OTHER PUBLICATIONS

Nov. 5, 2019 Written Opinion issued in International Patent Application No. PCT/JP2019/034858.
Jun. 14, 2022 Search Report issued in European Patent Application No. 19861507.2.

* cited by examiner

ANODE CATALYST LAYER FOR FUEL CELL AND FUEL CELL USING SAME

FIELD

The present invention relates to an anode catalyst layer for a fuel cell and a fuel cell using the same.

BACKGROUND

Since fuel cells have high power generation efficiency, are easy to miniaturize, and have little adverse effects on the environment, the use thereof is expected in various fields such as personal computers, mobile devices such as mobile phones, automobiles, and vehicles such as trains.

FIG. 3 shows an example of the structure of a fuel cell. The fuel cell (200) comprises, as a unit cell, a membrane electrode assembly (100), an anode side gas flow path (21), an anode side gas diffusion layer (22), an anode side separator (23), a cathode side gas flow path (31), a cathode side gas diffusion layer (32), and a cathode side separator (33). The membrane electrode assembly (100) has a structure in which an electrolyte membrane (10) having proton conductivity is sandwiched by the anode catalyst layer (20) and the cathode catalyst layer (30). Hydrogen is supplied to the anode side, and oxygen is supplied to the cathode side. Thus, an oxygen reduction reaction (A) occurs in the cathode catalyst layer, a hydrogen oxidation reaction (B) occurs in the anode catalyst layer (20), and power is generated due to the difference in the standard redox potentials $E_0$ of the reactions.

$$O_2 + 4H^+ + 4e^- \rightarrow 2\,H_2O \;(E_0 = 1.23\,V) \quad (A)$$

$$H_2 \rightarrow 2H^+ + 2e^- \;(E_0 = 0\,V) \quad (B)$$

The catalyst layer contains electrode catalyst particles, a carrier on which electrode catalyst particles are supported, and a proton-conducting binder. Generally, a carbon carrier is used as the carrier for the electrode catalyst particles of a fuel cell, and platinum or a platinum alloy is used as the electrode catalyst particles. An ionomer is conventionally used as the proton-conducting binder.

It is known that in anode catalyst layers, hydrogen deficiency may occur in the catalyst layer due to a situation such as a delay in supply of hydrogen to the anode side due to abrupt changes in output or a stop in supply of hydrogen to the anode side due for some other reason. If operation of the cell continues at this time, the water electrolysis reaction (C) or reaction (D) in which the carbon carrier in the catalyst layer reacts with water to produce protons and electrons together with carbon monoxide or carbon dioxide, or both occur in order to compensate for the lack of protons ($H^+$).

$$2H_2O \rightarrow O_2 + 4H^+ + 4e^- \quad (C)$$

$$C + nH_2O \rightarrow CO_n + 2nH^+ + 2ne^- \;(n = 1 \text{ or } 2) \quad (D)$$

In reaction (D), since the carbon carrier in the catalyst layer reacts and disappears, when the hydrogen deficient state continues in the anode catalyst layer, the catalyst layer deteriorates. In particular, when the reaction overpotential of the water electrolysis reaction (C) becomes high and the reaction efficiency thereof decreases, reaction (D) tends to occur, and the disappearance of the carbon carrier proceeds.

As a countermeasure therefor, providing the anode catalyst layer with water electrolysis catalyst particles such as iridium oxide is known (for example, Patent Literature 1 to 3). By using such water electrolysis catalyst particles, the water in the anode catalyst layer is electrolyzed without reacting with the carbon carrier. The electrolyzed water then supplies protons and electrons, whereby operation of the cell can continue. In the prior art, the disappearance of the carbon carrier is prevented by using such water electrolysis catalyst particles.

CITATION LIST

Patent Literature

[PTL 1] Japanese Unexamined Patent Publication (Kokai) No. 2008-41411

[PTL 2] Japanese Unexamined Patent Publication (Kokai) No. 2009-152143

[PTL 3] Japanese Unexamined Patent Publication (Kokai) No. 2010-277995

SUMMARY

Technical Problem

However, the investigations of the present inventors have revealed that the anode catalyst layers according to the prior art, even if water electrolysis catalyst particles are used, deteriorate due to long-term hydrogen deficiency. An object of the present invention is to provide an anode catalyst layer which does not easily deteriorate even if a hydrogen deficient state continues for a long time, and a fuel cell using the anode catalyst layer.

Solution to Problem

The present inventors have discovered that the above object can be achieved by the present invention including the following aspects.

<<Aspect 1>>

An anode catalyst layer for a fuel cell, comprising electrode catalyst particles, a carbon carrier on which the electrode catalyst particles are supported, water electrolysis catalyst particles, a proton-conducting binder, and graphitized carbon, wherein the content of the graphitized carbon in the anode catalyst layer for a fuel cell is 3% by mass to 70% by mass relative to the total mass of the electrode catalyst particles, the carbon carrier, and the graphitized carbon.

<<Aspect 2>>

The anode catalyst layer for a fuel cell according to Aspect 1, wherein the crystallite size Lc of the graphitized carbon is 4.0 nm or more.

<<Aspect 3>>

The anode catalyst layer for a fuel cell according to Aspect 1 or 2, wherein the carbon carrier has a BET specific surface area of 200 m²/g or more.

<<Aspect 4>>

The anode catalyst layer for a fuel cell according to any one of Aspects 1 to 3, wherein the water electrolysis catalyst particles are at least one type of particles selected from the group consisting of iridium, ruthenium, rhenium, palladium, rhodium and oxides thereof.

<<Aspect 5>>

The anode catalyst layer for a fuel cell according to Aspect 4, wherein the water electrolysis catalyst particles are iridium oxide particles.

<<Aspect 6>>

The anode catalyst layer for a fuel cell according to any one of Aspects 1 to 5, wherein the graphitized carbon has a number average particle diameter of 1 to 100 μm.

<<Aspect 7>>

A membrane electrode assembly, comprising the anode catalyst layer according to any one of Aspects 1 to 6, a cathode catalyst layer, and an electrolyte membrane sandwiched by the anode catalyst layer and the cathode catalyst layer.

<<Aspect 8>>

A fuel cell, comprising, as a unit cell, the membrane assembly according to Aspect 7, an anode side gas flow path, an anode side gas diffusion layer, an anode side separator, a cathode side gas flow path, a cathode side gas diffusion layer, and a cathode side separator.

<<Aspect 9>>

A method for the production of an anode catalyst layer for a fuel cell, comprising the steps of:

mixing a carbon carrier on which electrode catalyst particles are supported, water electrolysis catalyst particles, a proton-conducting binder, and graphitized carbon to obtain a catalyst layer composition, and forming a catalyst layer from the catalyst layer composition, wherein the content of the graphitized carbon in the catalyst layer is 3% by mass to 70% by mass relative to the total mass of the electrode catalyst particles, the carbon carrier, and the graphitized carbon.

DESCRIPTION OF EMBODIMENTS

<<Anode Catalyst Layer for Fuel Cell>>

The anode catalyst layer for a fuel cell of the present application comprises:

electrode catalyst particles, a carbon carrier on which the electrode catalyst particles are supported, water electrolysis catalyst particles, a proton-conducting binder, and graphitized carbon, wherein the content of the graphitized carbon in the catalyst layer is 3% by mass to 70% by mass relative to the total mass of the electrode catalyst particles, the carbon carrier, and the graphitized carbon.

As described in Patent Literature 1 to 3, conventionally, water electrolysis catalyst particles have been used in order to prevent the carbon carrier from disappearing and the anode catalyst layer from deteriorating in a hydrogen deficient state. However, the investigations of the present inventors have revealed that anode catalyst layers, even if such water electrolysis catalyst particles are used, deteriorate due to long-term hydrogen deficiency. Conversely, the present inventors have discovered that by including a specific quantity of graphitized carbon in the anode catalyst layer, deterioration of the anode catalyst layer can be prevented even if a hydrogen deficient state continues for a long time.

Figure 2:
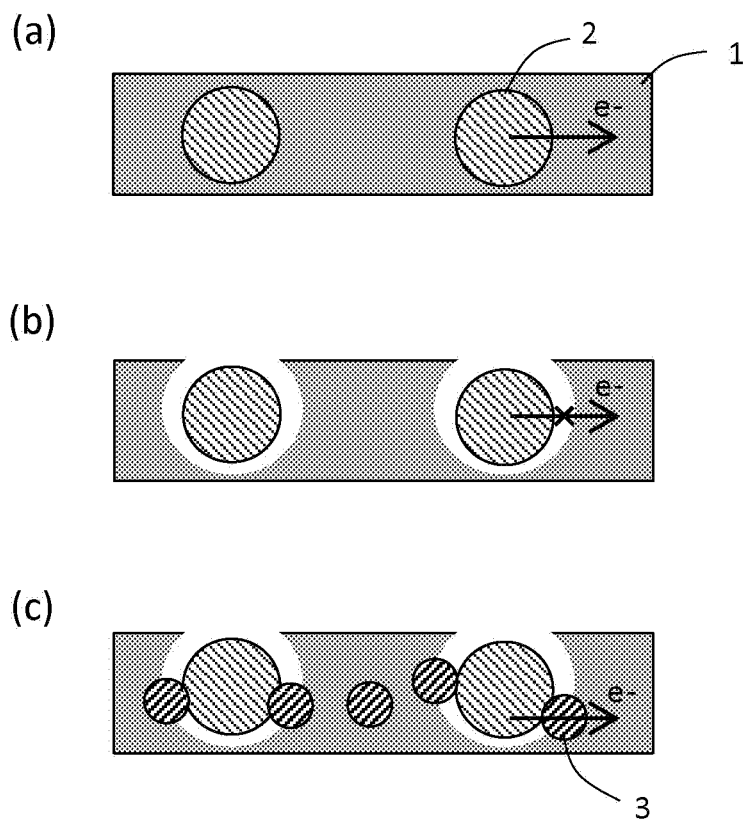
FIG. 2(a) schematically illustrates a catalyst layer containing water electrolysis catalyst particles.
FIG. 2(b) schematically illustrates a state in which a carbon carrier in a catalyst layer containing the water electrolysis catalyst particles disappears.
FIG. 2(c) schematically illustrates a state in which a carbon carrier in a catalyst layer containing water electrolysis catalyst particles and graphitized carbon disappears.
Figure 3:
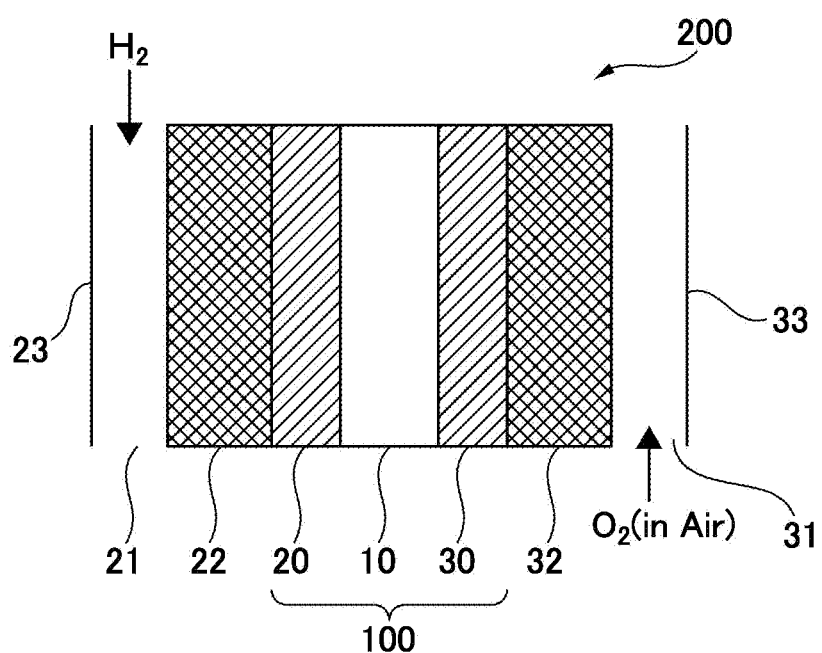
FIG. 3 illustrates an example of an aspect of a fuel cell.

Although not bound by theory, in the anode catalyst layer (1) containing the water electrolysis catalyst particles of the prior art as shown in FIG. 2(a), it is considered that, when the hydrogen deficient state continues for a long time, water and the carbon carrier react around the water electrolysis catalyst particles (2) and disappear. In this case, as shown in FIG. 2(b), the carbon carrier disappears around the water electrolysis catalyst particles (2), whereby the water electrolysis catalyst particles (2) are electrically insulated. Thus, it is considered that the water electrolysis reaction on the water electrolysis catalyst particles does not proceed and/or the electrical conduction of the catalyst layer is prevented, whereby the resistance of the catalyst layer (1) increases. Conversely, when a specific quantity of graphitized carbon (3) is contained in the catalyst layer (1), since the graphitized carbon (3) is unlikely to disappear even if the carbon carrier disappears, it is considered that conduction of the water electrolysis catalyst particles (2) through the graphitized carbon (3) can be secured, as shown in FIG. 2(c), whereby the resistance of the catalyst layer (1) is unlikely to increase.

The thickness of the catalyst layer of the present invention may be 1 μm or more, 3 μm or more, 5 μm or more, 10 μm or more, or 15 μm or more, and may be 50 μm or less, 30 μm or less, 20 μm or less, 15 μm or less, or 10 μm or less.

<Electrode Catalyst Particles>

The electrode catalyst particles used in the present invention include, for example, platinum or a platinum alloy. When a platinum alloy is contained, any platinum alloy which is suitably used in the prior art can suitable be used as the platinum alloy.

The average particle diameter of the electrode catalyst particles may be 1.5 nm or more, 2.0 nm or more, 2.5 nm or more, 3.0 nm or more, 3.5 nm or more, or 4.0 nm or more, and may be 8.0 nm or less, 6.0 nm or less, 5.0 nm or less, 4.0 nm or less, 3.5 nm or less, or 3.0 nm or less.

The average particle diameter of the electrode catalyst particles is calculated from the measured X-ray diffraction peaks using JADE analysis software. In this case, the average particle diameter is a number average particle diameter. The standard deviation of the particle diameter of the electrode catalyst particles can be calculated using the analysis software by the X-ray small angle scattering method. Nano-solver (manufactured by Rigaku Corporation) is an example of analysis software.

The content of the electrode catalyst particles in the present invention may be, based on the total mass of the carbon carrier and the electrode catalyst particles, 10% by mass or more, 20% by mass or more, 30% by mass or more, 35% by mass or more, 40% by mass or more, or 45% by mass or more, and may be 70% by mass or less, 60% by mass or less, 55% by mass or less, 50% by mass or less, 45% by mass or less, 40% by mass or less, or 35% by mass or less.

<Carbon Carrier>

The carbon carrier used in the present invention is not particularly limited as long the electrode catalyst particles are supported thereon and it has conductivity, and a carbon carrier conventionally used in the relevant field can be used.

For example, the BET specific surface area may be 200 $m^2/g$ or more, 400 $m^2/g$ or more, 600 $m^2/g$ or more, 800 $m^2/g$ or more, 1000 $m^2/g$ or more, 1200 $m^2/g$ or more, or 1500 $m^2/g$ or more, and may be 2500 $m^2/g$ or less, 2000 m²/g or less, 1800 m²/g or less, 1600 m²/g or less, 1400 m²/g or less, 1200 m²/g or less, or 1000 m²/g or less.

At least a part of the carbon carrier preferably has a crystallite size La of 3.0 nm or more. The crystallite size La is the crystallite size determined from the (110) diffraction line, and is measured in accordance with JIS K0131 using an X-ray diffractometer (Rigaku Corporation, RINT-2500). The crystallite size La of at least a part of the carbon carrier used in the present invention may be 3.5 nm or more, 4.0 nm or more, 5.0 nm or more, or 6.0 nm or more, and may be 30 nm or less, 20 nm or less, 10 nm or less, 8 nm or less, or 5 nm or less. The amorphousness of the carbon carrier increases as the crystallite size La decreases, and the crystallinity of the carbon carrier increases as the crystallite size La increases. When the carbon carrier has a crystallite size La in the range described above, it is possible to maintain the supporting ability of the electrode catalyst particles while suppressing deterioration of the catalyst layer. In addition, the investigations conducted by the present inventors have revealed that, though the crystallite size Lc of the carbon carrier is also related to the deterioration of the catalyst layer, La has a more direct relationship with the deterioration of the catalyst layer than Lc. It should be noted that the crystallite size Lc is, for example, a crystallite size determined from the (002) diffraction line or the (004) diffraction line.

Examples of the type of the carbon carrier include activated carbon, carbon black, carbon nanotubes, solid carbon, hollow carbon, dendritic carbon, and combinations thereof.

The average primary particle diameter of the particles of the carbon carrier may preferably be 500 nm or less, 300 nm or less, 200 nm or less, or 100 nm or less, and may be 5 nm or more, 10 nm or more, 20 nm or more, 30 nm or more, or 50 nm or more. In this case, the average particle diameter can be calculated from the number average equivalent diameter based on a large number of photographs taken at arbitrary locations with an electron microscope. It should be noted that the equivalent diameter refers to a diameter of a precise circle having an outer peripheral length equal to an outer peripheral length of a surface thereof.

The total of the electrode catalyst particles and the carbon carrier in the anode catalyst layer of the present invention may be, based on the total mass of the anode catalyst layer, 10% by mass or more, 20% by mass or more, 30% by mass or more, 35% by mass or more, 40% by mass or more, or 45% by mass or more, and may be 85% by mass or less, 80% by mass or less, 70% by mass or less, 60% by mass or less, 55% by mass or less, 50% by mass or less, 45% by mass or less, or 40% by mass or less.

<Water Electrolysis Catalyst Particles>

Examples of the water electrolysis catalyst particles used in the present invention include water electrolysis catalyst particles conventionally known in the relevant field. Such water electrolysis catalyst particles are not particularly limited as long as they are a catalyst which suppresses the reaction between the carbon carrier and water and promotes the electrolysis of water when hydrogen is deficient in the catalyst layer. Examples of the water electrolysis catalyst particles include particles of iridium, ruthenium, rhenium, palladium, rhodium, and oxides thereof, and in particular, iridium oxide particles.

The number average particle diameter of the water electrolysis catalyst particles may be, for example, 30 nm or more, 50 nm or more, or 100 nm or more, and may be 1000 nm or less, 500 nm or less, 300 nm or less, or 100 nm or less. In this case, the number average particle diameter can be calculated from the number average equivalent diameter based on a large number of photographs taken at arbitrary positions with an electron microscope. Note that the equivalent diameter refers to a diameter of a precise circle having an outer peripheral length equal to an outer peripheral length of a surface thereof.

The amount of the water electrolysis catalyst particles may be, based on the total mass of the anode catalyst layer, 0.2% by mass or more, 0.5% by mass or more, 1.0% by mass or more, 1.5% by mass or more, 2.0% by mass or more, or 3.0% by mass or more, and may be 10% by mass or less, 8.0% by mass or less, 5.0% by mass or less, 3.0% by mass or less, 2.5% by mass or less, 2.0% by mass or less, or 1.5% by mass or less. Further, the water electrolysis catalyst particles may be contained, based on the total mass of the electrode catalyst particles, the carbon carrier, and the water electrolysis catalyst particles, in an amount of 3% by mass or more, 5% by mass or more, 8% by mass or more, or 10% by mass or more, and may be contained in an amount of 20% by mass or less, 15% by mass or less, 10% by mass or less, 8% by mass or less, or 5% by mass or less.

<Proton-Conducting Binder>

The proton-conducting binder used in the present invention is not particularly limited as long as it can conduct protons generated by the chemical reaction in the catalyst layer and can bind the carbon carrier and the water electrolysis catalyst particles, and is conventionally a polymer electrolyte, in particular, an ionomer. Any proton-conducting binder known in the relevant field can be used.

The amount of the proton-conducting binder used in the present invention may be, based on the total mass of the anode catalyst layer, 5% by mass or more, 10% by mass or more, 20% by mass or more, 30% by mass or more, 35% by mass or more, 40% by mass or more, or 45% by mass or more, and may be 70% by mass or less, 60% by mass or less, 55% by mass or less, 50% by mass or less, 45% by mass or less, 40% by mass or less, or 35% by mass or less.

<Graphitized Carbon>

The graphitized carbon used in the present invention can impart the advantageous effects of the present invention, and the type thereof is not particularly limited as long as it is a carbon material which has been graphitized to a certain extent, as described below. The graphitized carbon used in the present invention is different from the carbon carrier on which the electrode catalyst particles are supported, and has substantially no performance for supporting, for example, the electrode catalyst particles. When an attempt is made to support electrode catalyst particles of platinum on graphitized carbon, as used in the present invention, the particles become coarse. Thus, such graphitized carbon is not used as a carrier for the electrode catalyst particles.

The graphitized carbon is contained in the catalyst layer of the present invention in an amount of 3% by mass to 70% by mass with respect to the total mass of the electrode catalyst particles, the carbon carrier, and the graphitized carbon. The graphitized carbon may be contained in the catalyst layer, based on the total mass of the electrode catalyst particles and the graphitized carbon, in an amount of 3% by mass or more, 5% by mass or more, 10% by mass or more, 15% by mass or more, 20% by mass or more, 25% by mass or more, 30% by mass or more, 35% by mass or more, 40% by mass or more, 50% by mass or more, or 55% by mass or more, and may be contained in the catalyst layer in an amount of 70% by mass or less, 65% by mass or less, 60% by mass or less, 50% by mass or less, 40% by mass or less, or 30% by mass or less. When the catalyst layer contains graphitized carbon in such a range, deterioration of the catalyst layer can be suppressed and the function of the catalyst layer can be reliably exhibited. In particular, since the graphitized carbon is contained in an amount of 15% by mass or more or 20% by mass or more, the desired effect of the present invention can be reliably exhibited.

It is preferable that the graphitized carbon be contained in the catalyst layer of the present invention in an amount of 5% by volume to 70% by volume based on the total volume of the electrode catalyst particles, the carbon carrier, and the graphitized carbon. The graphitized carbon may be contained in the catalyst layer, based on the total mass of the electrode catalyst particles and the graphitized carbon, in an amount of 5% by volume or more, 10% by volume or more, 15% by volume or more, 20% by volume or more, 25% by volume or more, 30% by volume or more, 35% by volume or more, 40% by volume or more, or 50% by volume or more, and may be contained in the catalyst layer in an amount of 65% by volume or less, 60% by volume or less, 50% by volume or less, 40% by volume or less, or 30% by volume or less. When the catalyst layer contains graphitized carbon in such a range, deterioration of the catalyst layer can be suppressed and the function of the catalyst layer can be reliably exhibited. In particular, since the graphitized carbon is contained in an amount of 20% by volume or more or 25% by volume or more, the desired effect of the present invention can be reliably exhibited.

As used herein, "graphitized carbon" refers to a carbon material having a crystallite size Lc determined from the (002) diffraction line of 4.0 nm or more. The crystallite size Lc may be 5.0 nm or more, 6.0 nm or more, 8.0 nm or more, or 9.0 nm or more, and may be 50 nm or less, 30 nm or less, 20 nm or less, or 15 nm or less. The crystallite size Lc is measured in accordance with JIS K0131 using an X-ray diffractometer (Rigaku Corporation, RINT-2500). The production method of the graphitized carbon is not particularly limited as long as a carbon material having a crystallite size Lc as described above is used. It should be noted that the amorphousness of the carbon material increases as the crystallite size Lc decreases, and the crystallinity of the carbon material increases as the crystallite size Lc increases. If the crystallite size Lc of the graphitized carbon is excessively small, deterioration of the catalyst layer is unlikely to be suppressed.

The bulk density of the graphitized carbon is preferably 0.50 g/cm$_3$ or less, and may be, for example, 0.40 g/cm$^3$ or less, 0.35 g/cm$^3$ or less, 0.30 g/cm$^3$ or less, or 0.25 g/cm$^3$ or less, and may be 0.01 g/cm$^3$ or more, 0.05 g/cm$^3$ or more, or 0.10 g/cm$^3$ or more. Graphitized carbon having a bulk density in this range has a well-developed structure. Further, contact points between the water electrolysis catalyst particles and the graphitized carbon are easily secured, whereby deterioration of the catalyst layer can be suppressed and the function of the catalyst layer can be reliably exhibited.

The number average particle diameter of the graphitized carbon may be, for example, 1 μm or more, 3 μm or more, 5 μm or more, or 10 μm or more, and may be 30 μm or less, 20 μm or less, 10 μm or less, or 5 μm or less. In this case, the number average particle diameter can be calculated from the number average equivalent diameter based on a large number of photographs taken at arbitrary positions with an electron microscope.

The BET specific surface area of the graphitized carbon may be 2 m$^2$/g or more, 5 m$^2$/g or more, 10 m$^2$/g or more, 30 m$^2$/g or more, or 50 m$^2$/g or more, and may be 100 m$^2$/g or less, 80 m$^2$/g or less, 50 m$^2$/g or less, 30 m$^2$/g or less, or 20 m$^2$/g or less.

<<Method for Production of Anode Catalyst Layer for Fuel Cell>>

The method for producing the anode catalyst layer for a fuel cell of the present invention comprises the steps of:

mixing a carbon carrier on which electrode catalyst particles are supported, water electrolysis catalyst particles, a proton-conducting binder, and graphitized carbon to obtain a catalyst layer composition, and forming a catalyst layer from the catalyst layer composition, wherein the content of the graphitized carbon in the catalyst layer is 3% by mass to 70% by mass relative to the total mass of the electrode catalyst particles, the carbon carrier, and the graphitized carbon. The anode catalyst layer for a fuel cell of the present invention described above may be produced by the production method of the present invention.

This method may comprise the same step as conventionally known catalyst layer production methods, aside from the step of mixing the carbon carrier on which the electrode catalyst particles are supported, the water electrolysis catalyst particles, the proton-conducting binder, and the graphitized carbon to obtain a catalyst layer composition.

The carbon carrier on which the electrode particles are supported may be produced by a step of mixing an electrode catalyst particle precursor solution and the carbon carrier to obtain a precursor of the electrode catalyst particle-carbon carrier, and a step of heat-treating the precursor. When the electrode catalyst particles are platinum particles, the electrode catalyst particle precursor solution may be a platinate solution. In this case, the step of mixing the platinate solution and the carbon carrier to obtain a precursor of the electrode catalyst particle-carbon carrier may include a step of mixing the platinate solution and the carbon carrier to obtain a dispersion, and a step of separating the dispersion medium from the obtained dispersion. The step of heat-treating the precursor of electrode catalyst particles-carbon carrier can be carried out in an inert atmosphere or a reducing atmosphere.

Furthermore, the production of the carbon carrier on which the platinum particles are supported may include contacting the platinate solution with a carbon carrier and reducing the platinate with a reducing agent. A dinitrodiammine platinum nitric acid solution is an example of the platinate solution.

In the step of bringing the platinate solution into contact with the carbon carrier, the carbon carrier can be dispersed in an aqueous solvent and mixed with the platinate solution. In this case, by making the aqueous solvent acidic, the occurrence of precipitation, which may be occur during mixing of the platinate solution, may be suppressed.

The reducing agent is not particularly limited, but an alcohol, for example, ethanol, can be used. In the reduction step, heat treatment can be carried out after the reducing agent is added. Though the conditions of the heat treatment vary depending on the type of reducing agent, for example, when ethanol is used as a reducing agent, heating can be carried out at a temperature of 60° C. to 90° C., and a time of approximately 1 to 3 hours.

After the reduction step, the platinum particles and the carbon carrier may be separated from the dispersion to obtain platinum particles and a carbon carrier on which the platinum particles are supported. This separation may be carried out, for example, by filtration. After separating the platinum particles and the carbon carrier on which the platinum particles are supported, washing and/or drying may be carried out.

The carbon carrier on which the platinum particles are supported in this manner may be further subjected to heat treatment. The temperature of heat treatment may be, for example, 200° C. or higher, 300° C. or higher, 400° C. or higher, or 500° C. or higher, and may be 1100° C. or lower, 1050° C. or lower, 1000° C. or lower, 950° C. or lower, 900° C. or lower, or 800° C. or lower. The time of the heat treatment may be within 5 hours, within 3 hours, within 2 hours, within 1.5 hours, within 1.0 hours, or within 0.5 hours, and may be 0.2 hours or more, 0.3 hours or more, 0.5 hours or more, 0.8 hours or more, 1.0 hours or more, or 1.5 hours or more.

The step of forming the catalyst layer from the catalyst layer composition may be carried out by adding a dispersion medium to the catalyst layer composition and coating the base material therewith. In this case, the base material may be an electrolyte membrane, a gas diffusion layer, or another base material for coating.

Regarding the configuration of each element of the anode catalyst layer for a fuel cell produced by the production method of the present invention, refer to the description of the configuration of each of the element of the anode catalyst layer for a fuel cell of the present invention. Thus, regarding the carbon carrier used in the production method of the present invention, refer to the configuration of the carbon carrier described with regarding the anode catalyst for a fuel cell of the present invention.

<<Membrane Electrode Assembly>>

The membrane electrode assembly of the present invention includes the anode catalyst layer, a cathode catalyst layer, and an electrolyte membrane sandwiched by the anode catalyst layer and the cathode catalyst layer. The electrolyte membrane and the cathode catalyst layer can be those well-known in the relevant field.

The cathode catalyst layer may have the same configuration as that of the anode catalyst layer described above, except that the cathode catalyst layer does not contain graphitized carbon and water electrolysis catalyst particles.

As the electrolyte membrane, a membrane composed of a polymer similar to that of the proton-conducting binder used in the anode catalyst layer described above may be used.

<<Fuel Cell>>

The fuel cell of the present invention includes an anode side gas flow path, an anode side gas diffusion layer, an anode side separator, a cathode side gas flow path, a cathode side gas diffusion layer, and a cathode side separator as a unit cell. In the fuel cell of the present invention, these unit cells may be stacked to constitute a cell stack, whereby high power is obtained. Regarding the configurations other than the membrane electrode assembly, any known in the relevant field can be used for the fuel cell of the present invention.

EXAMPLES

Experiment A. Experiment Regarding Addition Amount of Graphitized Carbon

Production Examples

Example 1

0.5 grams of carbon black (Ketjen Black, Lion Corporation, ECP300, La: 1.1 nm, Lc: 1.9 nm, BET specific surface area: 800 m$^2$/g) as the carbon carrier was dispersed in 0.4 liters of pure water. A dinitrodiammine platinum nitric acid solution (U.S. Pat. No. 4,315,857: manufactured by Cataler Corporation) was added dropwise and sufficiently adsorbed to the carbon carrier to obtain a dispersion. The dinitrodiammine platinum nitric acid solution was added such that the total mass of the carbon black and platinum in terms of metal in the dispersion was 30% by mass.

Thereafter, ethanol was added as a reducing agent to the above dispersion, and reduction loading was carried out. The dispersion was then filtered, and the recovered powder was washed and dried to obtain a carbon carrier (platinum-carbon carrier) on which the platinum particles were to be supported.

Iridium oxide powder (Sigma-Aldrich) was added to the obtained platinum-carbon carrier such that the mass of iridium relative to the total mass of iridium and the platinum-carbon carrier was 9% by mass.

A commercially available graphitized carbon (Lc: 10 nm, specific surface area: 12 m$^2$/g, bulk density: 0.14 g/cm$^3$) was added to this mixture such that the mass ratio of graphitized carbon to the total mass of platinum-carbon carrier and graphitized carbon was 9% by mass to obtain the catalyst layer composition of Example 1.

Examples 2 to 5 and Comparative Examples 1 and 2

The catalyst layer compositions of Examples 2 to 5 and Comparative Examples 1 and 2 were obtained in the same manner as in Example 1, except that the addition amount of the graphitized carbon relative to the total amount of the platinum-carbon carrier and the graphitized carbon was changed as shown in Table 1.

<<Evaluation Methods>>

<Water Electrolysis Durability Evaluation Test>

Each of the catalyst layer compositions obtained in Examples 1 to 5 and Comparative Examples 1 and 2 was dispersed in an organic solvent, an ionomer dispersion was further added thereto and dispersed with ultrasonic waves. This dispersion was applied to a Teflon™ sheet to form a catalyst layer on the hydrogen electrode side. The amount of iridium was set to 0.2 mg per square centimeter of the catalyst layer. On the air electrode side, a catalyst layer was formed in the same manner as on the hydrogen electrode side except that iridium oxide and graphitized carbon were not used. Each catalyst layer was bonded by hot pressing via a polymer electrolyte membrane to prepare a membrane electrode assembly. A diffusion layer was then formed on both sides of the membrane electrode assembly to prepare an evaluation unit cell.

Onto the obtained unit cell, air was flowed onto the air electrode side at a flow rate of 2 liters/min, nitrogen was flowed to the hydrogen electrode side at a flow rate of 0.5 liters/min, and the hydrogen electrode side was maintained in a hydrogen deficient state in an environment of a cell temperature of 40° C. and a humidity of 128% (i.e., a humidity greater than the saturated water vapor amount by 28% at which liquid water can be formed). A constant current continuous operation at 0.2 A/cm$^2$ was then carried out using a potentiostat (HZ5000 manufactured by Hokuto Denko Corporation), and water electrolysis was caused to occur on the air electrode side. As a result of this operation, the water electrolysis overpotential increased, and the voltage applied to the unit cell in order to continue the constant current operation rose. This voltage rise was measured and the time until the voltage value reached −2 V was recorded and evaluated as the water electrolysis durability time.

<Power Generation Test>

Each of the catalyst layer compositions obtained in Examples 4 and 5 and Comparative Examples 1 and 2 was dispersed in an organic solvent, an ionomer dispersion was further added thereto and dispersed with ultrasonic waves. This dispersion was applied to a Teflon™ sheet to form a catalyst layer on the hydrogen electrode side. The amount of iridium was set to 0.2 mg per square centimeter of the catalyst layer. A catalyst layer was formed on the air electrode side in the same manner as in the hydrogen electrode side except that iridium oxide and graphitized carbon were not used. Each catalyst layer was bonded by hot pressing via a polymer electrolyte membrane to prepare a membrane electrode assembly. A diffusion layer was then formed on both sides of the membrane electrode assembly to prepare an evaluation unit cell.

Onto the obtained unit cell, air was flowed onto the air electrode side at a flow rate of 2 liters/min, and hydrogen was flowed to the hydrogen electrode side at a flow rate of 0.5 liters/min under an environment of a cell temperature of 80° C. and a humidity of 100%. The voltage value was then measured when the current of 1.5 A/cm$^2$ was applied using the loading device.

<<Results>>

The results of these tests are shown in Table 1. Furthermore, a graph in which the addition amount of graphitized carbon is plotted on the horizontal axis and the water electrolysis durability time and the power generation voltage are plotted on the vertical axis is shown in FIG. 1.

TABLE 1

|       | Graphitized Carbon [mass %] | Water Electrolysis Durability Time [sec] | Generated Voltage [V] |
|-------|----|--------|-------|
| Ex 1  | 9  | 10836  | —     |
| Ex 2  | 18 | 35429  | —     |
| Ex 3  | 27 | 62243  | —     |
| Ex 4  | 36 | 108920 | 0.379 |
| Ex 5  | 60 | 155720 | 0.380 |
| Comp Ex 1 | 75 | 191630 | 0.320 |
| Comp Ex 2 | 0  | 5411   | 0.378 |

Figure 1:
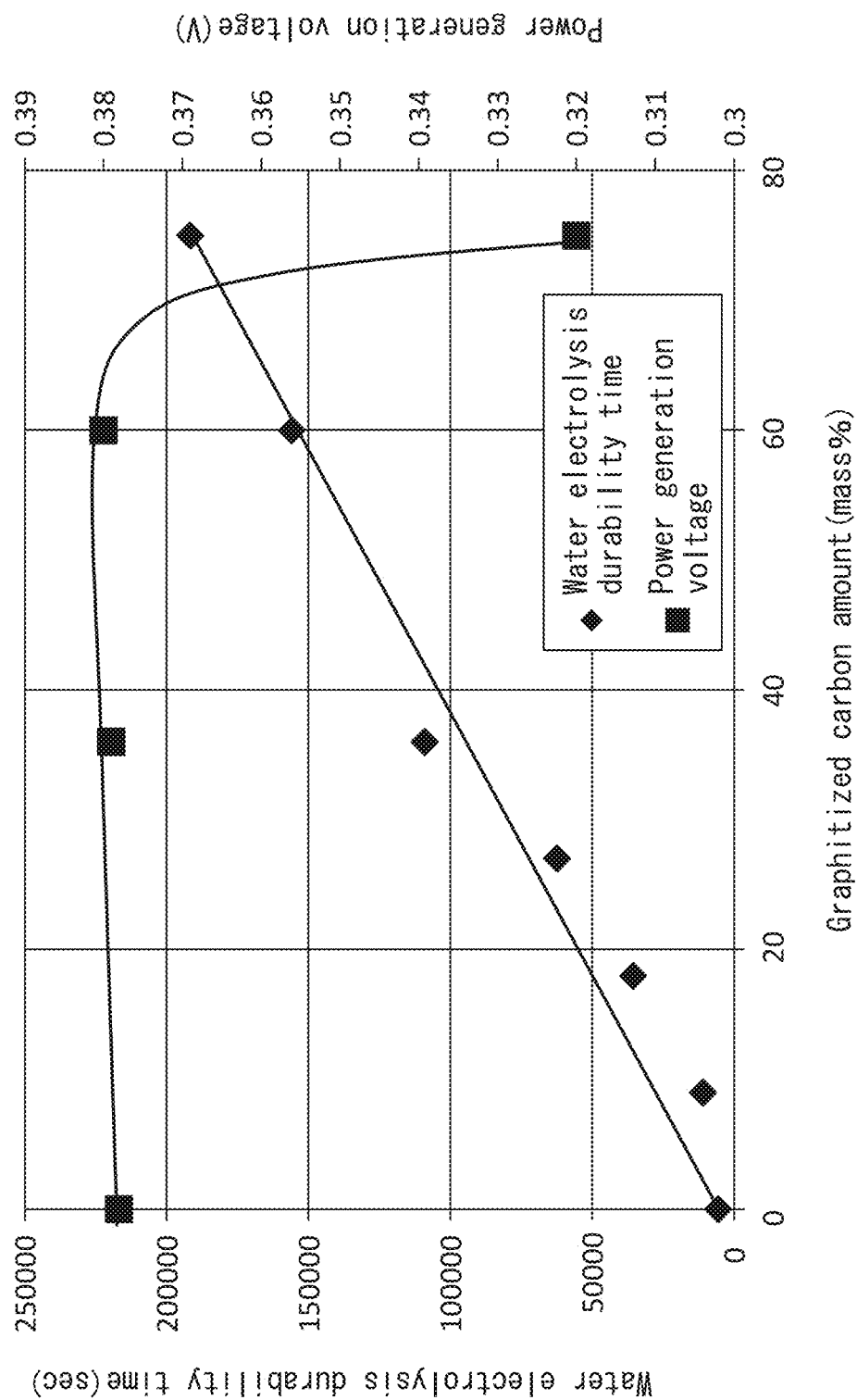
FIG. 1 shows a graph in which the addition amount of graphitized carbon is plotted on the horizontal axis and the water electrolysis durability time and the power generation voltage are plotted on the vertical axis.

As is clear from FIG. 1, the greater the content of graphitized carbon, the longer the water electrolysis durability time and the higher the durability. Furthermore, it can be understood that the generated voltage does not decrease as long as the content of graphitized carbon is up to approximately 70% by mass.

Experiment B. Experiment Regarding Crystallite Size La of Carbon Carrier, Specific Surface Area, and Bulk Density Examples 6 to 10 and Comparative Example 3

The catalyst layer compositions of Examples 6 to 10 were obtained in the same manner as in Example 4, except that the graphitized carbon added was changed to the commercially available graphitized carbons having the crystallite sizes Lc, specific surfaces areas, and bulk densities shown in Table 2. Furthermore, the catalyst layer composition of Comparative Example 3 was obtained in the same manner as in Example 4 except that a carbon black derived from acetylene having a crystallite size Lc of 3.6 nm was used in place of graphitized carbon.

Tests were performed in the same manner as in Experiment A above using these catalyst layer compositions. The results are shown in Table 2

TABLE 2

|       | Added Carbon | | | Water Electrolysis | |
|-------|---|---|---|---|---|
|       | Crystallite Size Lc [nm] | Specific Surface Area [m$^2$/g] | Bulk Density [g/cm$^3$] | Durability Time (sec) | Generated Voltage [V] |
| Ex 4  | 10   | 12 | 0.14  | 108920 | 0.379 |
| Ex 6  | 8.8  | 27 | 0.34  | 118808 | 0.379 |
| Ex 7  | 6.3  | 57 | 0.144 | 122655 | 0.378 |
| Ex 8  | 5.0  | 80 | 0.10  | 122132 | 0.376 |
| Ex 9  | 18.0 | 7  | 0.22  | 166897 | 0.376 |
| Ex 10 | 16.0 | 3  | 0.44  | 78904  | 0.378 |
| Comp Ex 3 | 3.6 | 60 | 0.04 | 5669   | 0.377 |

In Comparative Example 3, in which an added carbon having a small crystallite size Lc was used, the water electrolysis durability time was short, whereas in each of the Examples in which a graphitized carbon having a predetermined degree of crystallite size was used, the water electrolysis durability time could be extended.

Experiment C. Experiment Regarding Crystallite Size La of Carbon Carrier

Examples 11 to 14 and Comparative Example 1

The catalyst layer compositions of Examples 11 to 14 were obtained in the same manner as in Example 1, except that the type of carbon carrier was changed to the commercially available carbon carriers described in Table 3.

The water electrolysis durability test and the power generation test described in Experiment A described above were carried out using these catalyst layer compositions.

<<Results>>

These evaluation results are shown in Table 3.

TABLE 3

|       | Carbon Carrier | | | | |
|-------|---|---|---|---|---|
|       | Graphitized Carbon [mass %] | La [nm] | BET Specific Surface Area [m$^2$/g] | Water Electrolysis Durability Time (sec) | Generated Voltage [V] |
| Ex 11 | 36 | 6.3 | 250 | 235657 | 0.380 |
| Ex 12 | 36 | 5.5 | 800 | 237330 | 0.376 |
| Ex 13 | 36 | 3.6 | 150 | 213222 | 0.378 |
| Ex 14 | 36 | 3.5 | 100 | 212890 | 0.377 |
| Ex 4  | 36 | 1.1 | 800 | 108920 | 0.379 |
| Comp Ex 1 | 0 | 1.1 | 800 | 5411 | 0.378 |

In each of the Examples in which a carbon carrier having a large crystallite size La and the graphitized carbon were used in combination, the water electrolysis durability time could be extended.

Reference Experiment D. Evaluation of the Supporting Performance of Electrode Catalyst Particles by Graphitized Carbon In order to clarify the difference between carbon carrier and graphitized carbon, the supporting performance of the electrode catalyst particles by graphitized carbon was evaluated.

Platinum was supported on only graphitized carbon in the same manner as in Examples 4 and 10, except that only the graphitized carbon was used without the use of a carbon carrier. The total surface area of the platinum particles supported on the graphitized carbon was then measured by the CO gas adsorption method. Further, regarding Comparative Example 1, which contained no graphitized carbon, the total surface area of platinum particles was measured by the same method.

As a result, the total surface area of the platinum particles supported on the graphitized carbon used in Examples 4 and 10 was 0.19 times and 0.02 times, respectively, the total surface area of the platinum particles supported on the carbon carrier of Comparative Example 1.

From this result, it can be seen that the graphitized carbon as used in Examples 4 and 10 is unsuitable as a carbon carrier for supporting the electrode catalyst particles. In the present invention, by using carbon (graphitized carbon) of a type not used as a carbon carrier in combination with an ordinary carbon carrier, an advantageous effect can be exhibited.

REFERENCE SIGNS LIST 1 catalyst layer
2 water electrolysis catalyst particles
3 graphitized carbon
10 electrolyte membrane
20 anode catalyst layer
21 anode side gas flow path
22 anode side gas diffusion layer
23 anode side separator
30 cathode catalyst layer
31 cathode side gas flow path
32 cathode side gas diffusion layer
33 cathode side separator
100 membrane electrode assembly
200 fuel cell

The invention claimed is:

1. An anode catalyst layer for a fuel cell, comprising electrode catalyst particles, a carbon carrier on which the electrode catalyst particles are supported, water electrolysis catalyst particles, a proton-conducting binder, and graphitized carbon, wherein:
the content of the graphitized carbon in the anode catalyst layer for a fuel cell is 3% by mass to 70% by mass relative to the total mass of the electrode catalyst particles, the carbon carrier, and the graphitized carbon;
a crystallite size Lc of the graphitized carbon is from 4.0 nm to 50 nm; and
the electrode catalyst particles are not supported on the graphitized carbon.

2. The anode catalyst layer for a fuel cell according to claim 1, wherein the carbon carrier has a BET specific surface area of 200 m²/g or more.

3. The anode catalyst layer for a fuel cell according to claim 1, wherein the water electrolysis catalyst particles are at least one type of particles selected from the group consisting of iridium, ruthenium, rhenium, palladium, rhodium and oxides thereof.

4. The anode catalyst layer for a fuel cell according to claim 3, wherein the water electrolysis catalyst particles are iridium oxide particles.

5. The anode catalyst layer for a fuel cell according to claim 1, wherein the graphitized carbon has a number average particle diameter of 1 to 100 μm.

6. A membrane electrode assembly, comprising the anode catalyst layer according to claim 1, a cathode catalyst layer, and an electrolyte membrane sandwiched by the anode catalyst layer and the cathode catalyst layer.

7. A fuel cell, comprising, as a unit cell, the membrane assembly according to claim 6, an anode side gas flow path, an anode side gas diffusion layer, an anode side separator, a cathode side gas flow path, a cathode side gas diffusion layer, and a cathode side separator.

8. A method for the production of an anode catalyst layer for a fuel cell, comprising the steps of:
mixing a carbon carrier on which electrode catalyst particles are supported, water electrolysis catalyst particles, a proton-conducting binder, and graphitized carbon to obtain a catalyst layer composition, and
forming a catalyst layer from the catalyst layer composition, wherein:
the content of the graphitized carbon in the catalyst layer is 3% by mass to 70% by mass relative to the total mass of the electrode catalyst particles, the carbon carrier, and the graphitized carbon;
a crystallite size Lc of the graphitized carbon is from 4.0 nm to 50 nm; and
the electrode catalyst particles are not supported on the graphitized carbon.

9. The anode catalyst layer for a fuel cell according to claim 3, wherein the water electrolysis catalyst particles are at least one type of particles selected from the group consisting of iridium, ruthenium, rhenium, palladium, rhodium and oxides thereof.

10. The anode catalyst layer for a fuel cell according to claim 9, wherein the water electrolysis catalyst particles are iridium oxide particles.

* * * * *